(12) United States Patent
Cho

(10) Patent No.: US 12,362,400 B2
(45) Date of Patent: Jul. 15, 2025

(54) BATTERY PACK

(71) Applicant: SAMSUNG SDI CO., LTD., Yongin-si (KR)

(72) Inventor: Hyun Cho, Yongin-si (KR)

(73) Assignee: SAMSUNG SDI CO., LTD., Yongin-si (KR)

( * ) Notice: Subject to any disclaimer, the term of this patent is extended or adjusted under 35 U.S.C. 154(b) by 0 days.

(21) Appl. No.: 18/650,191

(22) Filed: Apr. 30, 2024

(65) Prior Publication Data

US 2024/0283038 A1    Aug. 22, 2024

Related U.S. Application Data

(63) Continuation of application No. 17/723,987, filed on Apr. 19, 2022, now Pat. No. 12,034,128.

(30) Foreign Application Priority Data

Jul. 29, 2021    (KR) .......................... 10-2021-0099794

(51) Int. Cl.
    *H01M 10/42*    (2006.01)
    *H01M 50/105*    (2021.01)
    *H01M 50/204*    (2021.01)
    *H01M 50/533*    (2021.01)
    *H01M 50/595*    (2021.01)

(52) U.S. Cl.
    CPC ....... *H01M 10/425* (2013.01); *H01M 50/105* (2021.01); *H01M 50/204* (2021.01); *H01M 50/533* (2021.01); *H01M 50/595* (2021.01); *H01M 2200/00* (2013.01)

(58) Field of Classification Search
    CPC ............. H01M 10/425; H01M 50/105; H01M 50/204; H01M 50/533; H01M 50/595; H01M 2200/00; H01M 50/233; H01M 50/284; H01M 50/528; H01M 50/588; H01M 50/202; H01M 10/42;
    (Continued)

(56) References Cited

U.S. PATENT DOCUMENTS

2009/0191450 A1    7/2009 Kim
2010/0209768 A1    8/2010 Ahn et al.
(Continued)

FOREIGN PATENT DOCUMENTS

KR        10-1075304 B1    10/2011
KR    10-2015-0035040 A    4/2015
(Continued)

OTHER PUBLICATIONS

Machine Translation of WO/2018230805 A1 (Year: 2018).*

*Primary Examiner* — Stewart A Fraser
(74) *Attorney, Agent, or Firm* — Lee IP Law, P.C.

(57) ABSTRACT

A battery pack includes: a battery cell having a cell tab extending outwardly; a protection circuit module electrically connected to the cell tab to prevent over-charging and over-discharging of the battery cell; and a module case accommodating the protection circuit module and mounted on the battery cell, wherein the module case includes a first region, a second region positioned on the first region, and a third region extending from the first region through the second region, and the protection circuit module is accommodated in a cavity provided between the first region and the second region.

20 Claims, 6 Drawing Sheets

(58) Field of Classification Search
CPC ............. H01M 50/178; H01M 50/572; H01M 2220/30; Y02E 60/10
See application file for complete search history.

(56) References Cited

U.S. PATENT DOCUMENTS

| | | |
|---|---|---|
| 2011/0086242 A1 | 4/2011 | Lee |
| 2011/0171498 A1 | 7/2011 | Baek |
| 2013/0149561 A1 | 6/2013 | Hong et al. |
| 2016/0218402 A1 | 7/2016 | Choi et al. |
| 2016/0233554 A1* | 8/2016 | Choi ................... H01M 50/121 |
| 2018/0183112 A1 | 6/2018 | Cheong et al. |
| 2018/0261900 A1* | 9/2018 | Kim .................... H01M 10/425 |

FOREIGN PATENT DOCUMENTS

| | | | |
|---|---|---|---|
| WO | WO 2009/011470 A1 | 1/2009 | |
| WO | WO-2018230805 A1 * | 12/2018 | ............ H01M 10/42 |

\* cited by examiner

BATTERY PACK

CROSS-REFERENCE TO RELATED APPLICATION

This is a continuation of U.S. patent application Ser. No. 17/723,987 filed Apr. 19, 2022, which is incorporated by reference herein in its entirety.

This application is based on and claims priority under 35 U.S.C. § 119 to Korean Patent Application No. 10-2021-0099794, filed on Jul. 29, 2021, in the Korean Intellectual Property Office, the disclosure of which is incorporated by reference herein in its entirety.

BACKGROUND

1. Field

Embodiments relate to a battery pack.

2. Description of the Related Art

Unlike primary batteries, which are not chargeable, secondary batteries can be charged and discharged. A low-capacity secondary battery may be used for portable small-sized electronic devices, such as a smartphone, a feature phone, a notebook computer, a digital camera, or a camcorder, and a high-capacity secondary battery is widely used as a power source for motor drives, such as those in hybrid vehicles or electric vehicles, and a battery for power storage. A secondary battery may include an electrode assembly including a positive electrode plate, a separator, and a negative electrode plate, and an exterior material for accommodating the electrode assembly. The exterior material can be characterized as round, prismatic and pouch types according to the shape thereof.

The above information disclosed in this Background section is only for enhancement of understanding of the background of the disclosure and therefore it may contain information that does not constitute prior art.

SUMMARY

Embodiments are directed to a battery pack, including: a battery cell having a cell tab extending outwardly; a protection circuit module electrically connected to the cell tab to prevent overcharging and overdischarging of the battery cell; and a module case accommodating the protection circuit module and mounted on the battery cell, wherein the module case includes a first region, a second region positioned on the first region, and a third region extending from the first region through the second region, and the protection circuit module is accommodated in a cavity provided between the first region and the second region.

The battery cell may include an electrode assembly to which the cell tab is connected, and an exterior material for accommodating the electrode assembly, wherein the exterior material includes a first casing part, a second casing part positioned on the first casing part, a third casing part positioned in front of the second casing part, and a fourth casing part extending from the third casing part and the first casing part and passing through the cell tab, and the module case may be seated on the fourth casing part and the third casing part.

The first region of the module case may be positioned on the fourth casing part of the exterior material, and the third region of the module case may be positioned on the third casing part of the exterior material.

The battery pack may include a first double-sided adhesive tape interposed between the first region of the module case and the fourth casing part of the exterior material, and a second double-sided adhesive tape interposed between the third region of the module case and the third casing part of the exterior material.

A height of the third region of the module case may be equal to or smaller than a height of the third casing part of the exterior material.

The height of the third region of the module case may be greater than a height of the second region of the module case.

The module case may include a coupling protrusion protruding from the second region toward the first region to couple the protection circuit module, and the protection circuit module may include a recess to which the coupling protrusion is coupled.

The protection circuit module may include a connector extending in a longitudinal direction, and the module case may include an opening through which the connector passes.

The first region of the module case may include an opening configured to receive the cell tab of the battery cell.

The battery pack may include a protective tape that extends while being attached to the bottom surface of the fourth casing part to block the cavity of the module case and is adhered to the second region of the module case.

BRIEF DESCRIPTION OF DRAWINGS

Features will become apparent to those of skill in the art by describing in detail example embodiments with reference to the attached drawings in which.

DETAILED DESCRIPTION

Figure 1A:
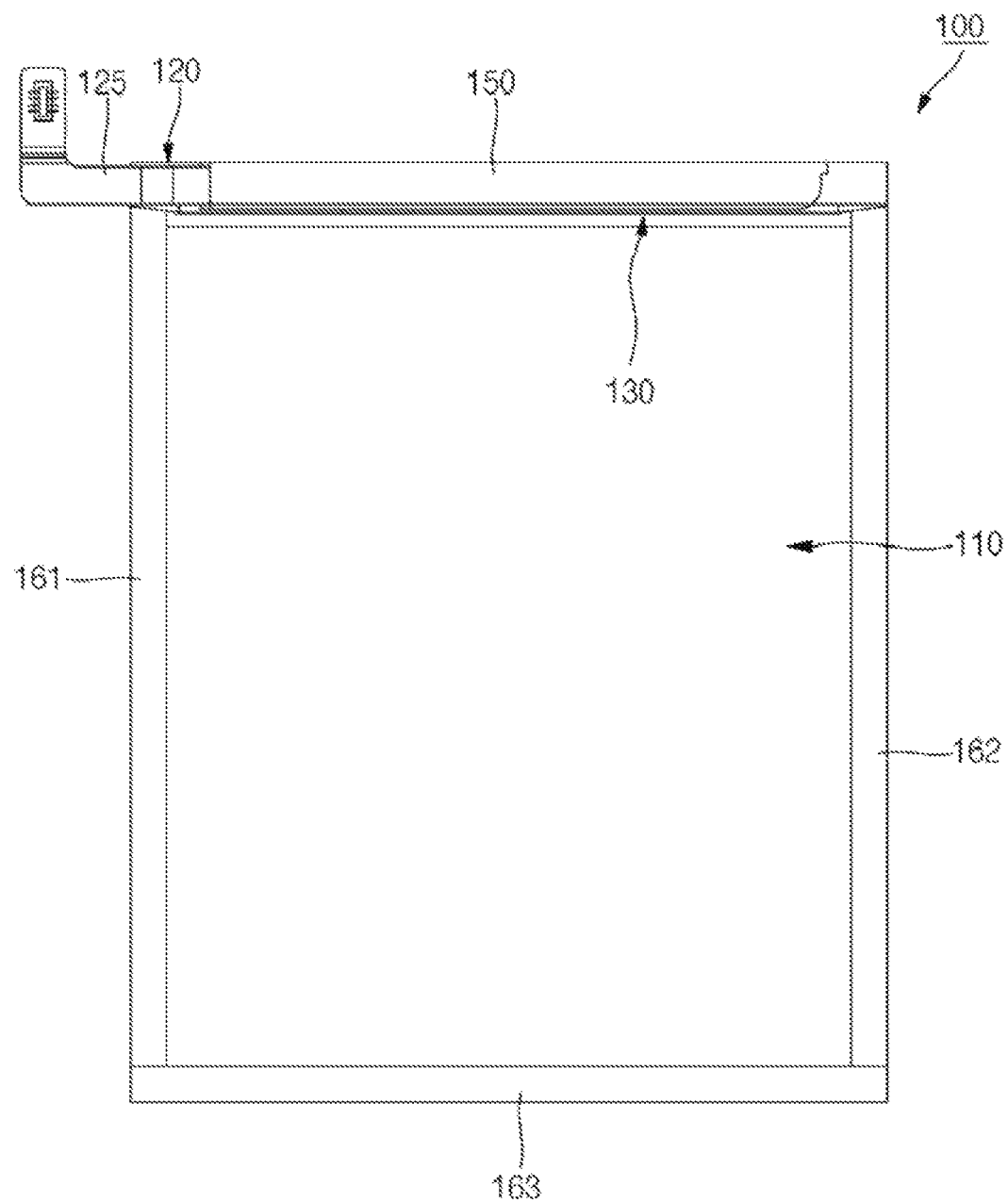
FIGS. 1A and 1B are a plan view and an exploded perspective view, respectively, illustrating a battery pack according to an example embodiment.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey example implementations to those skilled in the art.

In the drawing figures, the dimensions of layers and regions may be exaggerated for clarity of illustration. Like reference numerals refer to like elements throughout.

As used herein, the term "and/or" includes any and all combinations of one or more of the associated listed items. In addition, it will be understood that when an element A is referred to as being "connected to" an element B, the element A can be directly connected to the element B or an intervening element C may be present therebetween such that the element A and the element B are indirectly connected to each other.

As used herein, the singular forms are intended to include the plural forms as well, unless the context clearly indicates otherwise. It will be further understood that the terms that the terms "comprise" or "include" and/or "comprising" or "including," when used in this specification, specify the presence of stated features, numbers, steps, operations, elements, and/or components, but do not preclude the presence or addition of one or more other features, numbers, steps, operations, elements, components, and/or groups thereof.

It will be understood that, although the terms first, second, etc., may be used herein to describe various members, elements, regions, layers and/or sections, these members, elements, regions, layers and/or sections should not be limited by these terms. These terms are only used to distinguish one member, element, region, layer and/or section from another. Thus, for example, a first member, a first element, a first region, a first layer and/or a first section discussed below could be termed a second member, a second element, a second region, a second layer and/or a second section without departing from the teachings of the present example embodiment.

Spatially relative terms, such as "beneath," "below," "lower," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the element or feature in the figures is turned over, elements described as "below" or "beneath" other elements or features would then be oriented "on" or "above" the other elements or features. Thus, the example term "below" can encompass both an orientation of above and below.

Figure 1B:
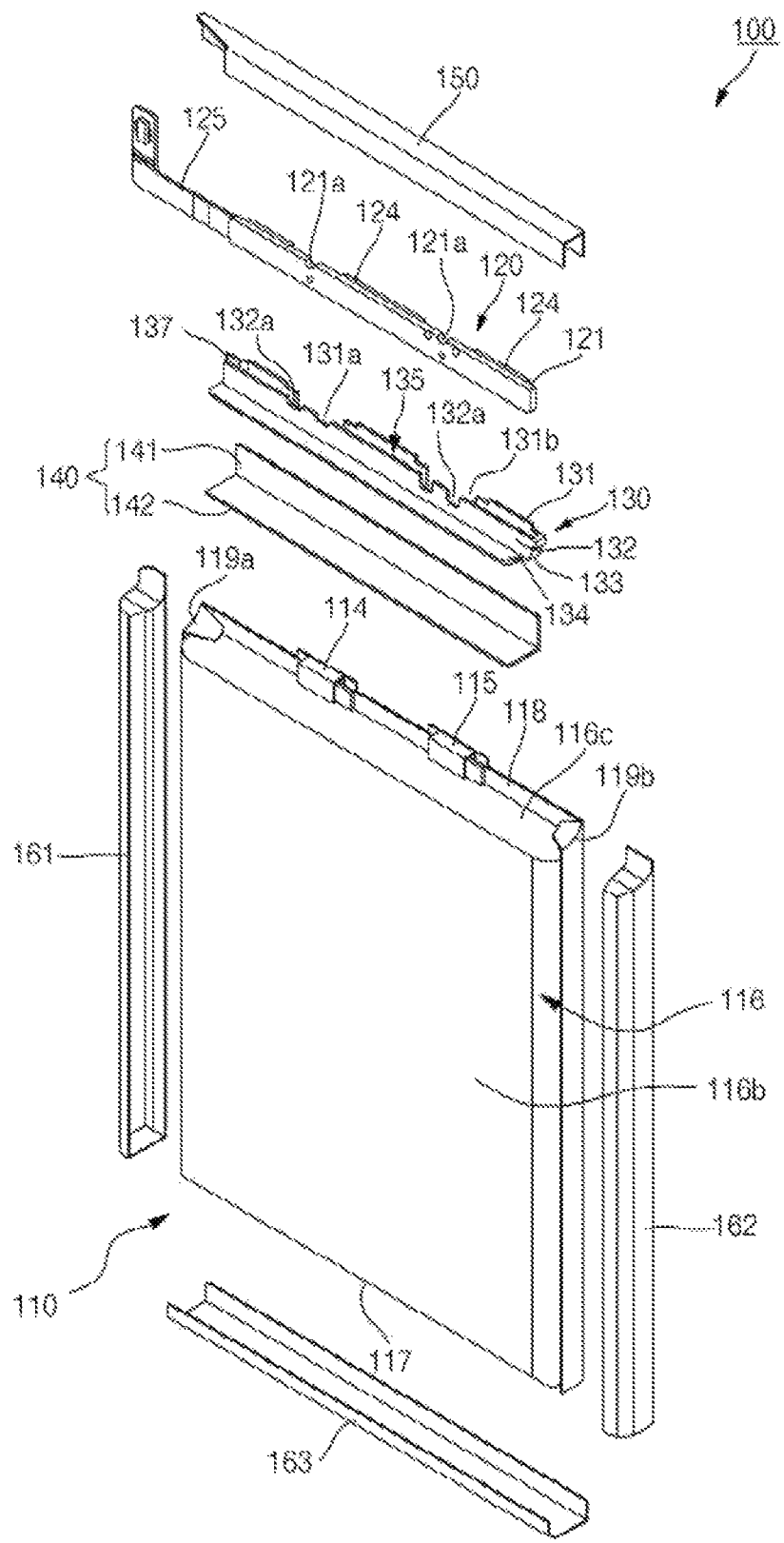

FIGS. 1A and 1B are a plan view and an exploded perspective view, respectively, illustrating a battery pack 100 according to an example embodiment.

In the example shown in FIGS. 1A and 1B, the battery pack 100 of the present example embodiment may include a battery cell 110, a protection circuit module 120, and a module case 130. The battery pack 100 may include a double-sided adhesive tape 140 and/or a protective tape 150. The battery pack 100 may include covers 161 and 162 for covering and protecting the side periphery of the battery cell 110, and a cover 163 for covering and protecting the rear periphery of the battery cell 110. The battery cell 110 may include an electrode assembly 110A (see FIG. 2C), a positive electrode cell tab 114, a negative electrode cell tab 115, and an exterior material 116. The positive electrode cell tab 114 may extend to the outside of the exterior material 116 while being connected to a positive electrode plate 111 (see FIG. 2C) of the electrode assembly 110A, and the negative electrode cell tab 115 may extend to the outside of the exterior material 116 while being connected to a negative electrode plate (112 of FIG. 2C). The exterior material 116 may include a first casing part 116a, a second casing part 116b, a third casing part 116c, a fourth casing part 118, a fifth casing part 117, and peripheral sealing parts 119a and 119b. The positive electrode cell tab 114 and the negative electrode cell tab 115 may extend to the outside of the battery cell 110 through the fourth casing part 118. The fourth casing part 118 may include or be referred to as a terrace. The exterior material 116 may protect the electrode assembly 110A from external environments, and for this purpose, in addition to the peripheral sealing parts 119a and 119b, the fourth casing part 118 may also be subjected to sealing treatment. The fourth casing part 118 may also include a region roughly sealed with the first casing part 116a. The fourth casing part 118 may mean a region extending frontward from the third casing part 116c to then be sealed, and a region extending frontward from the first casing part 116a to then be sealed.

The protection circuit module 120 may include a printed circuit board 121 having a recess 121a, a positive electrode welding tab (122 of FIG. 2B) to which the positive electrode cell tab 114 is inserted and welded, and a negative electrode welding tab (123 of FIG. 2B) to which the negative electrode cell tab 115 is inserted and welded. The protection circuit module 120 may include a charge/discharge protection device (e.g., an integrated circuit, a switching element, a resistance element, a sensor, etc.) 124, and a connector 125. The protection circuit module 120 may monitor charging/discharging voltages, charging/discharging currents, and/or temperatures of the battery cell 110 to protect the battery cell 110 from overcharging and overdischarging. The connector 125 may be connected to an external electronic device to charge or discharge the battery cell 110.

The module case 130 may include a first region 131, a second region 132, a third region 134, and a fourth region 133. A pair of openings 131a and 131b spaced apart from each other may be provided to the first region 131. A test hole 132a and/or a coupling protrusion (138 of FIG. 5), spaced apart from each other, may be provided to the second region 132. A cavity 135 may be provided between the first region 131 and the second region 132. An opening 137 may be provided at one end of each of the first region 131 and the second region 132. The protection circuit module 120 may be accommodated in the cavity 135 of the module case 130.

The double-sided adhesive tape 140 may be interposed between the module case 130 and the battery cell 110. The double-sided adhesive tape 140 may be provided in an approximately "L" shape, and may include a first double-sided adhesive tape 141 and a second double-sided adhesive tape 142.

The protective tape 150 may wrap the battery cell 110 and the module case 130, thereby insulating the protection circuit module 120 disposed in the module case 130 from external environments and protecting the battery cell 110 from external shocks.

The covers 161 and 162 may wrap the peripheral sealing parts 119a and 119b of the battery cell 110, respectively, and the cover 163 may wrap the fifth casing part 117 of the battery cell 110, thereby protecting the battery cell 110 from external impacts.

Figure 2A:
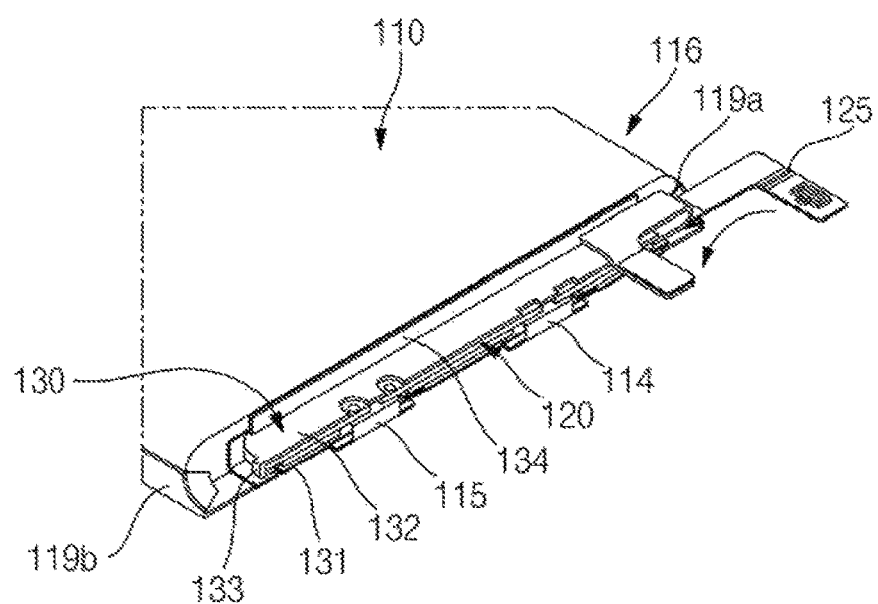
FIGS. 2A, 2B, and 2C are a partially enlarged perspective view, a front view, and a partial cross-sectional view illustrating a battery pack according to an example embodiment.
Figure 2B:
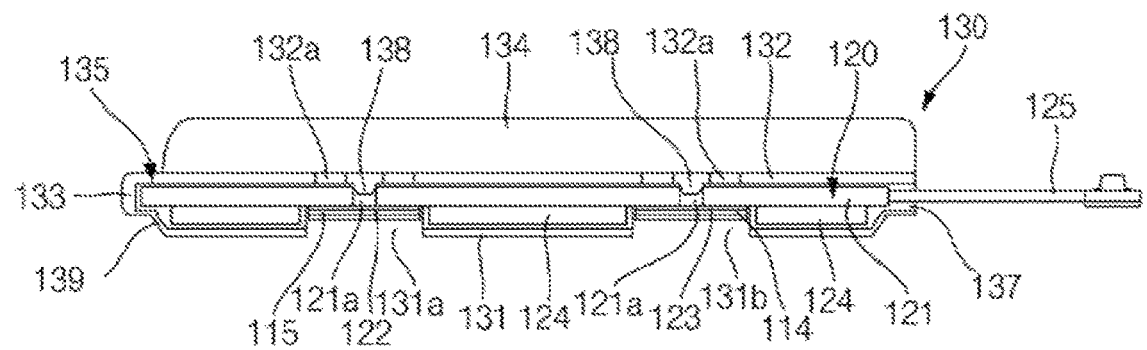
Figure 2C:
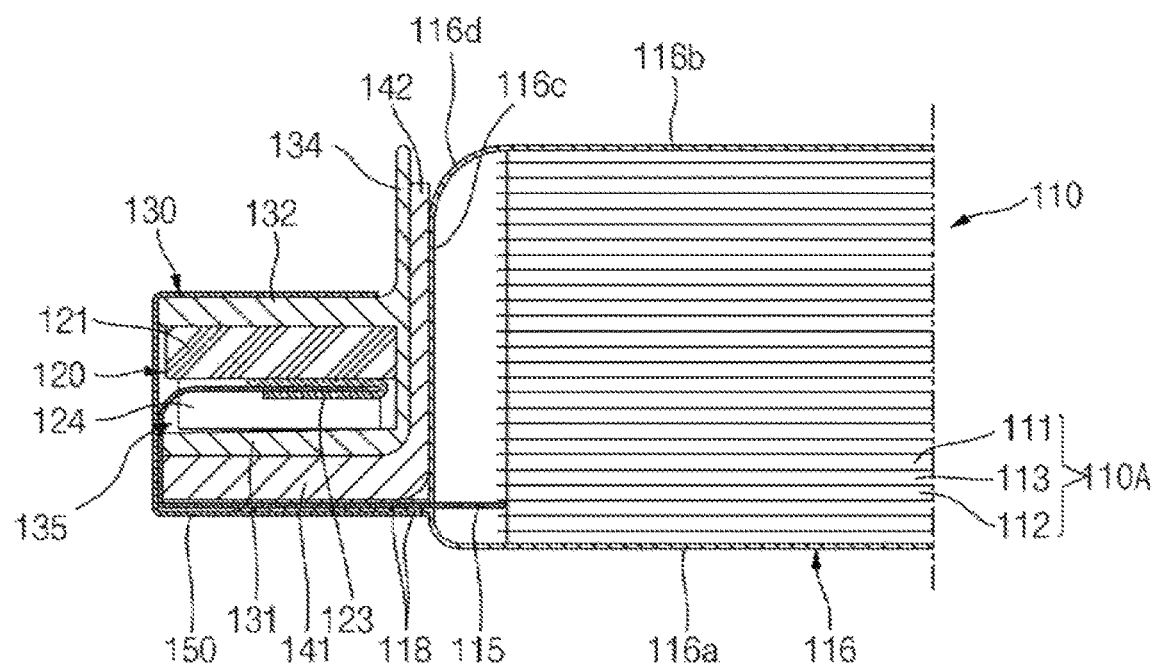

FIGS. 2A, 2B, and 2C are a partially enlarged perspective view, a front view, and a partial cross-sectional view, respectively, illustrating the battery pack 100 according to an example embodiment.

Referring to FIGS. 2A, 2B, and 2C, the battery pack 100 of the present example embodiment may include the protection circuit module 120 and the module case 130 mounted to the battery cell 110. The module case 130, in which the protection circuit module 120 is accommodated, may be seated on the fourth casing part 118 of the battery cell 110.

The battery cell 110 may include the electrode assembly 110A to which the cell tabs 114 and 115 are connected. The electrode assembly 110A may include the positive electrode plate 111, the negative electrode plate 112, and a separator 113 positioned therebetween. The electrode assembly 110A may be surrounded by the exterior material 116. A liquid electrolyte, a gel electrolyte, or a solid electrolyte may be accommodated inside the exterior material 116. The exterior material 116 may include or be referred to as a laminate exterior material in which an insulating layer is provided on an upper surface and a lower surface, respectively, around a thin metal film. The exterior material 116 may also be referred to as a pouch. The exterior material 116 may include the first casing part 116a positioned below the electrode assembly 110A, the second casing part 116b positioned above the electrode assembly 110A as an upper portion of the first casing part 116a, the third casing part 116c positioned in front of the second casing part 116b, and the fourth casing part 118 extending from the third casing part 116c and the first casing part 116a, and through which the positive electrode cell tab 114 and the negative electrode cell tab 115 pass. The plane of the fourth casing part 118 may be substantially parallel to the plane of the first casing part 116a and/or the plane of the second casing part 116b, and may be substantially perpendicular to the plane of the third casing part 116c. A curved portion 116d may be further provided between the second casing part 116b and the third casing part 116c. The peripheral sealing parts 119a and 119b may extend and fold to both sides of the fourth casing part 118.

The module case 130 may be seated on the fourth casing part 118 and the third casing part 116c of the exterior material 116. The module case 130 may be provided with or formed of an insulating material including polycarbonate (PC), polyimide (PI), polypropylene (PP), or polyethylene (PE). The first region 131 of the module case 130 may be positioned on the fourth casing part 118 of the exterior material 116. The third region 134 of the module case 130 may be positioned on the third casing part 116c of the exterior material 116. The module case 130 may include be referred to as a module cover, module housing, or module exterior material.

The first double-sided adhesive tape 141 may be interposed between the first region 131 of the module case 130 and the fourth casing part 118 of the exterior material 116. The second double-sided adhesive tape 142 may be interposed between the third region 134 of the module case 130 and the third casing part 116c of the exterior material 116. The double-sided adhesive tape 140 constituted by the first double-sided adhesive tape 141 and the second double-sided adhesive tape 142 may be bent in an approximately "L" shape.

The module case 130 may include the first region 131, the second region 132 positioned above the first region 131, and the third region 134 extending upward from the first region 131 while passing through the second region 132. The protection circuit module 120 may be accommodated in the cavity 135 provided between the first region 131 and the second region 132. The cavity 135 may have widths in the horizontal direction and the vertical direction to sufficiently accommodate the printed circuit board 121 and the protection circuit module 120 including the charge/discharge protection device 124.

The first region 131 of the module case 130 may accommodate the positive electrode cell tab 114 and the positive electrode welding tab 122 connected thereto, and may also include the openings 131a and 131b in which the negative electrode cell tab 115 and the negative electrode welding tab 123 connected thereto are accommodated, respectively. A height of the third region 134 of the module case 130 may be less than or equal to a height of the third casing part 116c of the exterior material 116. The height of the third region 134 of the module case 130 may be greater than a height of the second region 132 of the module case 130. The height of the third casing part 116c may mean a height ranging up to the uppermost end of the curved portion 116d connected to the second casing part 116b.

The coupling protrusion 138 of the module case 130 may protrude toward the protection circuit module 120 from the second region 132 of the module case 130 so as to be coupled to the protection circuit module 120 accommodated in the cavity 135 of the module case 130. The recess 121a of the protection circuit module 120 may be provided in a region corresponding to the coupling protrusion 138. Accordingly, the recess 121a of the protection circuit module 120 may be coupled to the coupling protrusion 138 of the module case 130.

The connector 125 of the protection circuit module 120 may extend in the longitudinal direction of the printed circuit board 121. The connector 125 may be electrically connected to an electronic device, and may be bent into various shapes. The module case 130 may include the opening 137 through which the connector 125 passes.

A lower region of the protective tape 150 may be adhered to the fourth casing part 118 of the exterior material 116, a front region of the protective tape 150 may block the cavity 135 of the module case 130, and an upper region of the protective tape 150 may be attached to the module case 130 of the second region 132. Accordingly, by the protective tape 150, insulation of the protection circuit module 120 may be secured and insulation of the cell tabs 114 and 115 may also be secured.

The battery pack 100 described above may distribute a fall shock, e.g., a shock resulting from a fall, by action of, among other things, the module case 130 covering the protection circuit module 120. In addition, the battery pack 100 may have a reduced thickness by making the module case 130 slim. In addition, the battery pack 100 may improve heat dissipation performance by allowing the third region 134 of the module case 130 to serve to emit the heat of the battery cell 110 to the outside.

Figure 3:
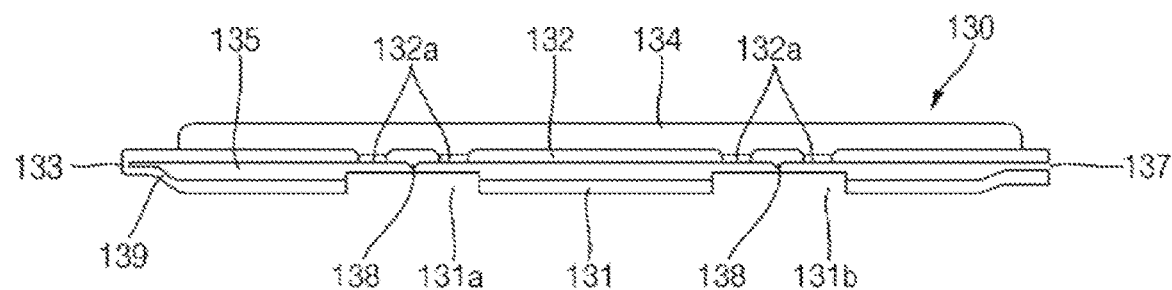
FIG. 3 is a perspective view illustrating an example module case in a battery pack according to an example embodiment.
Figure 4:
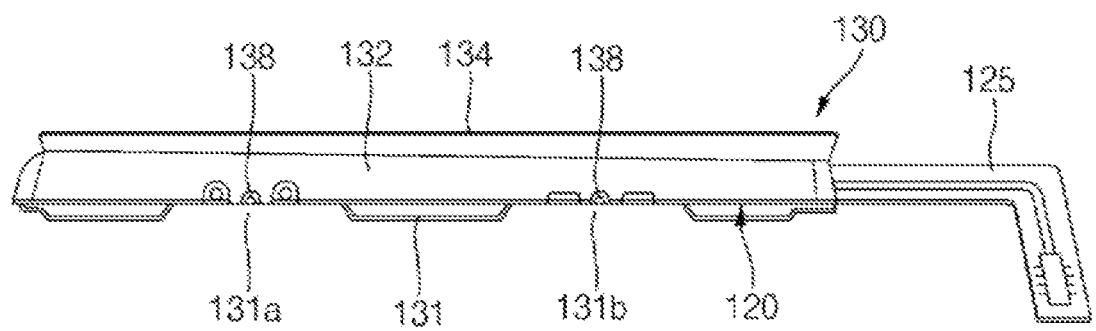
FIG. 4 is a perspective view illustrating a coupling relationship between an example module case and an example protection circuit module in a battery pack according to an example embodiment.

FIG. 3 is a perspective view illustrating an example of the module case 130 in the battery pack 100 according to an example embodiment. FIG. 4 is a perspective view illustrating a coupling relationship between the example module case 130 and an example protection circuit module 120 in the example battery pack 100 of the present example embodiment.

In the example shown in FIGS. 3 and 4, the coupling protrusion 138 may protrude from the second region 132 of the module case 130 toward the first region 131. The coupling protrusion 138 may protrude toward the openings 131a and 131b.

The positive electrode cell tab 114 and the positive electrode welding tab 122, and the negative electrode cell tab 115 and the negative electrode welding tab 123 may be exposed through the pair of openings 131a and 131b.

In addition, a step 139, for preventing interference with the peripheral sealing parts 119a and 119b of the exterior material 116, may be further provided as the first region 131 of the module case 130 at both sides thereof. In addition, a closed fourth region 133 may be provided at one side of each of the first region 131 and the second region 132 of the module case 130. The opening 137, through which the connector 125 is drawn out, may be provided at the other side of the module case 130.

Figure 5:
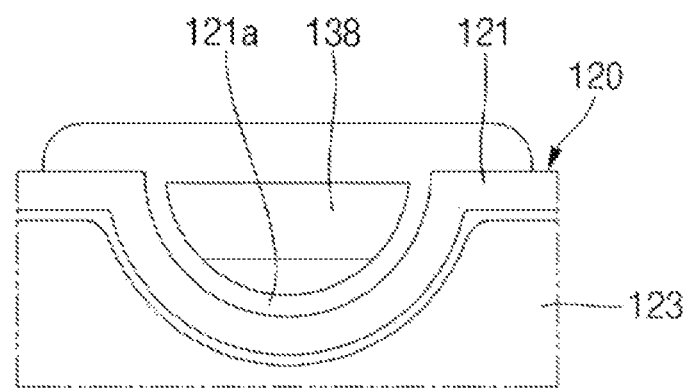
FIG. 5 is an enlarged view illustrating an example coupling protrusion provided in an example module case in a battery pack according to an example embodiment.

FIG. 5 is an enlarged view illustrating an example coupling protrusion 138 provided in the example module case 130 in the example battery pack 100 of the present example embodiment.

In the example shown in FIG. 5, the coupling protrusion 138 may protrude from the second region 132 of the module case 130 toward the first region 131 or the openings 131a and 131b. A recess 121a may be provided in the printed circuit board 121 of the protection circuit module 120 corresponding to the coupling protrusion 138. Accordingly, the coupling protrusion 138 of the module case 130 may be coupled to the recess 121a of the printed circuit board 121 of the protection circuit module 120, making the printed circuit board 121 and the module case 130 difficult to be separated from each other once the printed circuit board 121 is coupled to the module case 130.

Figure 6:
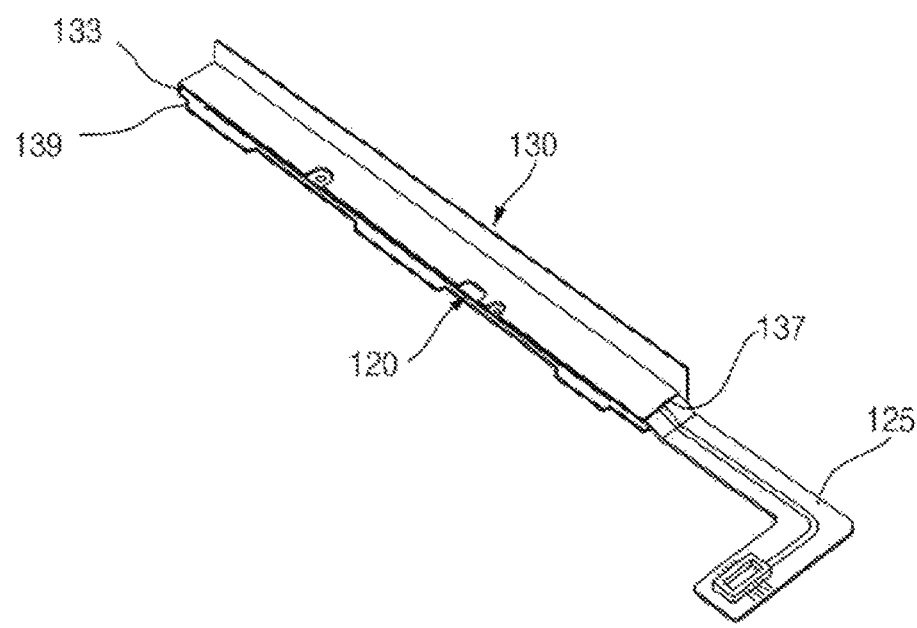
FIG. 6 is a perspective view illustrating a coupling relationship between an example module case and an example protection circuit module in a battery pack according to an example embodiment.

FIG. 6 is a perspective view illustrating a coupling relationship between the example module case 130 and the example protection circuit module 120 in the example battery pack 100 of the present example embodiment.

In the example shown in FIG. 6, the step 139 may be provided at one side of the module case 130 to prevent the module case 130 from interfering with the peripheral sealing parts 119a and 119b of the exterior material 116, and the opening 137 may be provided at the other end of the module case 130 to allow the connector 125 (which is connected to the protection circuit module 120) to be drawn out.

Figure 7:
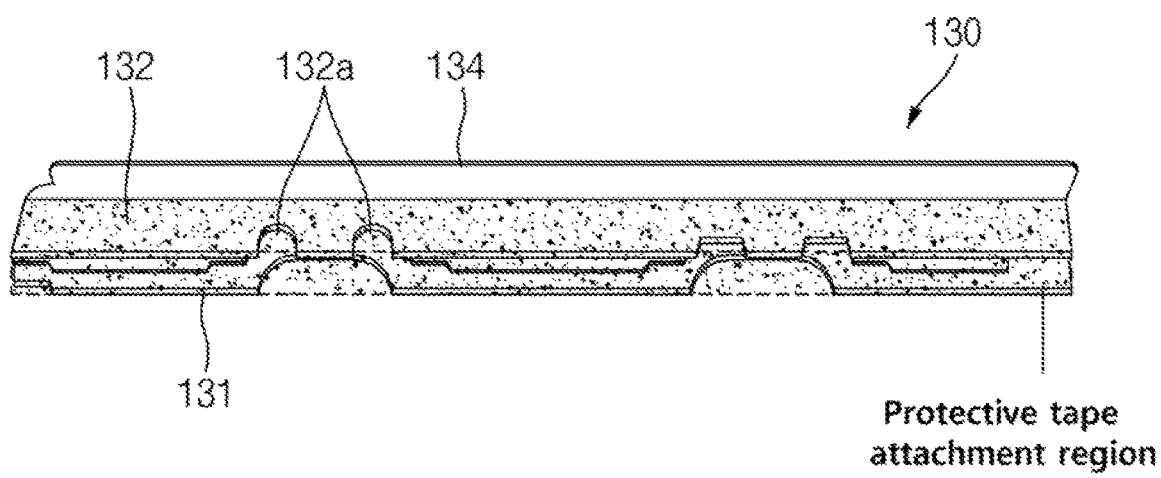
FIG. 7 is a perspective view illustrating an example module case having a tape attachment surface in a battery pack according to an example embodiment.

FIG. 7 is a perspective view illustrating the example module case 130 having an attachment surface for the protective tape 150 in the example battery pack 100 of the present example embodiment.

In the example shown in FIG. 7, and with further reference to FIG. 2C, the protective tape 150 may cover the cavity 135 of the module case 130 while being adhered to the fourth casing part 118, and may cover the second region 132 of the module case 130. Accordingly, the protective tape 150 may cover the protection circuit module 120 and the cell tabs 114 and 115, thereby securing insulation therebetween. In FIG. 7, for the convenience of understanding, the attachment surface of the protective tape 150 is shaded.

By way of summation and review, a pouch-type secondary battery may include a laminate pouch that is easy to deform into various shapes and has a small weight, and may include a protection circuit module mounted on one side of the laminate pouch to control charging and discharging of the battery.

As described above, a battery pack according to an example embodiment may include a module case covering a protection circuit module, to help distribute a fall shock.

The battery pack including the module case covering the protection circuit module may reduce an amount of impact by about 30% to about 40% when the battery pack is dropped.

In addition, a battery pack according to an example embodiment may have reduced thickness by manufacturing a slim module case.

According to an example embodiment, in the battery pack, the module case accommodating the protection circuit module may be seated on the fourth casing part, and thus the thickness of the battery pack may not be increased (for example, the thickness of the battery pack and the thickness of the battery cell may be substantially equal to each other), thereby enabling a reduction in thickness of an end device to which the battery pack is coupled.

In addition, a battery pack according to an example embodiment may include a heat dissipation element in the module case, thereby improving heat dissipation performance. In an example embodiment, heat generated from the battery cell may be rapidly dissipated to the outside through the module case, e.g., the third region of the module case may serve as a heat dissipation fin.

In a battery pack according to an example embodiment, a coupling force between the module case and the battery cell may be improved. The first and second double-sided adhesive tapes may include a ceramic adhesive layer having high thermal conductivity, which may enable heat from the battery cell to be quickly transferred to the module case, thereby improving heat dissipation performance.

In a battery pack according to an example embodiment, the height of the third region of the module case may not be greater than the height of the third casing part of the exterior material, and thus the thickness of the battery pack may not increase.

In a battery pack according to an example embodiment, the protection circuit module coupled to the module case may not be separated from the outside of the module case by an external impact.

In a battery pack according to an example embodiment, the connector may extend in the lateral direction, rather than extending in the front of the protection circuit module, and thus the length of the battery pack may not be increased.

In a battery pack according to an example embodiment, the exterior material may include peripheral sealing parts for sealing the first casing part and the second casing part on peripheries thereof, and the first region of the module case may include a step for preventing interference with the peripheral sealing parts. The step may be provided in a region overlapping each of the peripheral sealing parts of the module case, which may facilitate the installation of the module case and/or prevent the installation thickness from being increased.

In a battery pack according to an example embodiment, the cell tab of the battery cell may be directly welded to a welding tab of the protection circuit module, e.g., by laser welding or ultrasonic welding, in a state in which the protection circuit module is coupled to the module case, thereby simplifying the manufacturing process of the battery pack.

In a battery pack according to an example embodiment, the protective circuit module in the module case may be finished with a protective tape, which may help to ensure insulation from external environments, and improve a coupling force between the module case and the battery cell.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

EXPLANATION OF REFERENCE NUMERALS

100: Battery pack
110: Battery cell

110A: Electrode assembly
111: Positive electrode plate
112: Negative electrode plate
113: Separator
114: Positive electrode cell tab
115: Negative electrode cell tab
116: Exterior material
116a: First casing part
116b: Second casing part
116c: Third casing part
117: Fifth casing part
118: Fourth casing part
119a, 119b: Peripheral sealing part
120: Protection circuit module
121: Printed circuit board
121a: Recess
122: Positive electrode welding tab
123: Negative electrode welding tab
124: Charge/discharge protection device
125: Connector
130: Module case
131: First region
131a: Step
131a, 131b: Opening
132: Second region
132a: Test hole
133: Fourth region
134: Third region
135: Cavity
137: Opening
138: Coupling protrusion
141, 142: First, second double-sided adhesive tape
150: Protective tape
161, 162: Cover
163: Cover

What is claimed is:

1. A battery pack, comprising:
a battery cell having a cell tab extending outwardly;
a protection circuit module electrically connected to the cell tab, and configured to prevent overcharging and overdischarging of the battery cell; and
a module case accommodating the protection circuit module and mounted on the battery cell,
wherein the battery cell includes an electrode assembly and an exterior material, the electrode assembly being connected to the cell tab, the exterior material accommodating the electrode assembly and including peripheral sealing parts sealing peripheries of the exterior material, and each of the peripheral sealing parts including a folding portion folded toward the cell tab, and
wherein the folding portion is spaced apart from the module case.

2. The battery pack as claimed in claim 1, wherein the folding portion is spaced apart from the protection circuit module.

3. The battery pack as claimed in claim 1, wherein the folding portion does not interfere with the protection circuit module.

4. The battery pack as claimed in claim 1, wherein an entirety of the folding portion is spaced apart from an entirety of the module case along a direction parallel to a major surface of the module case.

5. The battery pack as claimed in claim 4, wherein the folding portion does not interfere with the module case, the folding portion and the module case having a non-overlapping relationship in a vertical direction perpendicular to the direction parallel to the major surface of the module case.

6. The battery pack as claimed in claim 1, wherein the exterior material further includes a first casing part, a second casing part positioned on the first casing part, a third casing part positioned in front of the second casing part, and a fourth casing part extending from the third casing part and the first casing part and through which the cell tab passes.

7. The battery pack as claimed in claim 6, wherein the folding portion is folded from the first casing part and the second casing part on the peripheries of the exterior material, the folded portion being folded toward the protection circuit module or the module case.

8. The battery pack as claimed in claim 6, wherein the module case is seated on the fourth casing part and the third casing part.

9. The battery pack as claimed in claim 6, wherein the module case includes a first region, a second region positioned on the first region, and a third region extending from the first region through the second region and above the second region, the protection circuit module being accommodated in a cavity between the first region and the second region.

10. The battery pack as claimed in claim 9, wherein the first region of the module case is positioned on the fourth casing part of the exterior material, and the third region of the module case is positioned on the third casing part of the exterior material.

11. The battery pack as claimed in claim 9, further comprising:
a first double-sided adhesive tape between the first region of the module case and the fourth casing part of the exterior material; and
a second double-sided adhesive tape between the third region of the module case and the third casing part of the exterior material.

12. The battery pack as claimed in claim 11, wherein the folding portion is spaced apart from the first double-sided adhesive tape or the second double-sided adhesive tape.

13. The battery pack as claimed in claim 11, wherein the folding portion does not interfere with the first double-sided adhesive tape or the second double-sided adhesive tape.

14. The battery pack as claimed in claim 9, wherein a height of the third region of the module case is equal to or smaller than a height of the third casing part of the exterior material, a portion of the third region above the second region including a surface facing away from the battery cell and being exposed to an exterior of the module case.

15. The battery pack as claimed in claim 9, wherein a height of the third region of the module case is greater than a height of the second region of the module case, a topmost surface of the third region being above a topmost surface of the second region.

16. The battery pack as claimed in claim 9, wherein:
the module case further includes a coupling protrusion protruding from the second region toward the first region to couple the protection circuit module, and
the protection circuit module further includes a recess to which the coupling protrusion is coupled.

17. The battery pack as claimed in claim 9, wherein:
the protection circuit module further includes a connector extending in a longitudinal direction of the protection circuit module, and
the module case further includes an opening through which the connector passes.

18. The battery pack as claimed in claim 9, wherein the first region of the module case further includes a step, the step being configured to prevent interference with the peripheral sealing parts.

19. The battery pack as claimed in claim 9, wherein the first region of the module case further includes an opening configured to receive the cell tab of the battery cell.

20. The battery pack as claimed in claim 9, further comprising a protective tape that extends while being attached to a bottom surface of the fourth casing part and the second region of the module case, the protective tape blocking the cavity of the module case.

\* \* \* \* \*